July 12, 1966 R. WIESNER 3,260,624

METHOD OF PRODUCING A P-N JUNCTION IN A MONOCRYSTALLINE SEMICONDUCTOR DEVICE

Filed May 8, 1962 4 Sheets-Sheet 1

July 12, 1966 R. WIESNER 3,260,624

METHOD OF PRODUCING A P-N JUNCTION IN A MONOCRYSTALLINE SEMICONDUCTOR DEVICE

Filed May 8, 1962 4 Sheets-Sheet 4

United States Patent Office 3,260,624
Patented July 12, 1966

3,260,624

METHOD OF PRODUCING A P–N JUNCTION IN A MONOCRYSTALLINE SEMICONDUCTOR DEVICE

Richard Wiesner, Munich, Germany, assignor to Siemens & Halske Aktiengesellschaft, Berlin, Germany, a corporation of Germany Filed May 8, 1962, Ser. No. 193,270
Claims priority, application Germany, May 10, 1961, S 73,904
11 Claims. (Cl. 148—175)

Figure 1:
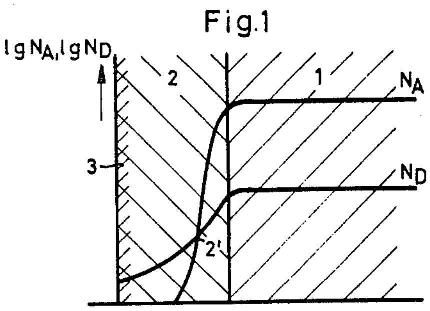

My invention relates to methods of producing p-n junctions in electronic semiconductor devices, particularly in devices that comprise a layer epitaxially grown upon a monocrystalline substratum.

According to such methods, a monocrystalline semiconductor layer is precipitated upon a monocrystalline carrier by thermo-chemically reducing a gaseous semiconductor compound at the heated surface of the carrier which constitutes the heat source for the reduction.

When using such an epitaxial method for the purpose of producing in the grown semiconductor layer such a graduated doping that the conductance in the grown layer increases from a small value to higher values in the direction toward the substratum or carrier, considerable difficulties are encountered. Such a gradual change in doping and electric conductance in an epitaxially precipitated layer is desired, for example, in cases where the carrier or substratum is to subsequently form the collector region of a transistor and the precipitated layer is to form the base region. The graduated doping is particularly favorable for semiconductor devices, for example, transistors that are to operate at high frequencies or extremely short switching intervals, because in such cases the emitter capacitance must be kept as small as feasible. For that reason a relatively high-ohmic zone must be produced in the epitaxially grown base region in front of the emitter.

It is an object of my invention to devise a method that reliably affords producing the above-mentioned graduated doping and conductance in the epitaxially grown semiconductor layer in a relatively simple and readily reproducible manner.

According to my invention, the desired graduation in conductance, increasing from a relatively small value in the direction toward the substratum of the epitaxially grown layer, is obtained by pyrolytically precipitating the monocrystalline semiconductor layer from the gaseous compound upon a monocrystalline substratum of the same semiconductor substance that is highly doped with donor-type defection atoms as well as with acceptor-type defection atoms, and the substratum as well as the layer epitaxially precipitated thereupon are subjected to a diffusion temperature for the length of time required to have only one of the two types of defection atoms diffuse through the grown layer to essentially determine the desired conductance type at the layer side or surface remote from the substratum, whereas the defection atoms of the other type have not yet reached an appreciable portion of the layer side.

According to one way of performing this method, the substratum and the epitaxially grown layer, upon termination of the precipitation process, are subjected to tempering until one of the defection types, diffusing during tempering from the substratum into the grown layer, forms the desired p-n junction and this one defection type essentially causes the desired type of electric conductance on the side of the grown layer facing away from the substratum while, as mentioned, the other type of defection atoms have virtually not yet reached an appreciable portion of this layer.

Another way of performing the method, applicable in lieu of, or in addition to, the above-mentioned tempering method, is to conduct the heating program during the epitaxial growth in a corresponding manner. That is, by selecting the rate of growth, the temperature and the growing duration, essentially only one type of beneficial impurity (activator or dope) atoms, diffusing during crystalline growth into the growing layer, will cause the desired conductance at the side of the grown layer facing away from the substratum, while the other type of defection atoms has virtually not yet reached a large portion of this layer.

The two types of activator atoms, namely donors and acceptors, already present in the monocrystalline substratum prior to epitaxial growth, are so chosen according to the invention that the one of these two types of activator substances that determines by its higher concentration the conductance type of the substratum, possesses a considerably lower diffusion coefficient than the other type of activator substance at the temperatures employed for epitaxial growth or at the temperature used for tempering subsequent to epitaxial growth. For example, when an epitaxially grown germanium layer is to be given n-type conductance, the carrier forming the substratum may be doped with phosphorus and indium to serve as donors and acceptors respectively, and the quantities of these two doping substances are to be dimensioned so that the carrier has p-type conductance.

For silicon, however, it is preferable to make the carrier n-conductive, particularly by a donor content of antimony and/or arsenic in relatively large concentration and an acceptor content of aluminum, gallium, boron and/or indium in smaller concentration. If desired, n-type conductance in a substratum of silicon can also be obtained by a high phosphorus doping if aluminum is used in smaller concentration, because the diffusion constant of aluminum in silicon is still greater than that of phosphorus.

For germanium, however, it is preferable to make the substratum strongly p-type conductive because the diffusion constant of the acceptors, particularly boron, indium and gallium, in germanium, is small compared with donors, particularly arsenic, antimony and phosphorus.

Figure 7:
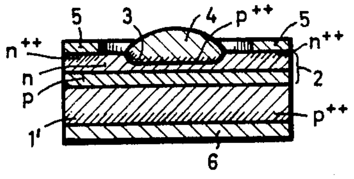
Figure 6:
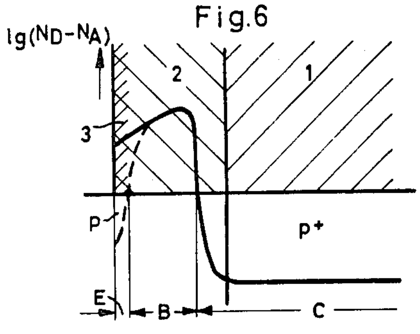

The invention will be further described and explained with reference to the drawings in which FIGS. 1 through 6 and 8 through 12 are explanatory graphs and FIG. 7 shows in cross section a transistor made according to the invention.

Figure 2:
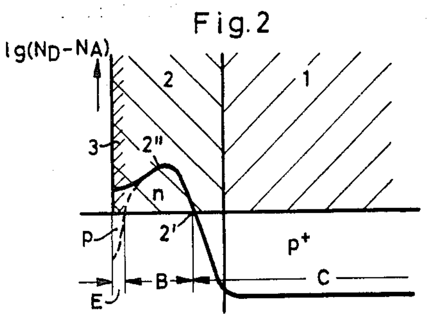

In the coordinate diagrams shown in FIGS. 1 and 2, the concentration of the acceptors ($N_A$) and donors ($N_D$) is plotted substantially on a logarithmic scale over the width of the semiconductor carrier or substratum 1 and over the width of the adjacent, epitaxially grown layer 2. The substratum possesses a high donor and acceptor concentration in the order of magnitude of about $10^{18}$ to $10^{19}$ atoms per cm.$^3$ and, in the illustrated embodiment, is so chosen that the density of the acceptors ($N_A$) considerably exceeds the density of the donors ($N_D$). Consequently, the substratum has $p^+$-conductance. This high conductance is desirable for collector regions of transistors because it causes only slight losses when traversed by electric current. As described above, the layer 2 is epitaxially grown upon the collector region 1. During such growth and/or during the subsequent tempering treatment according to the invention, a portion of the acceptors and donors diffused from the substratum 1 into the grown layer 2. The diffusion conditions and the acceptors and donors in the substratum 1 were so chosen that, after completion of the semiconductor device, the layer 2 possesses on the side facing away from the substratum 1 a slight density of the donors ($N_D$) which (FIG. 1) increases from the left to the right and hence in the direction toward the substratum 1. The acceptors ($N_A$), however, have not diffused through the layer 2. Due to the slight diffusion coefficient of the acceptors, therefore, the density of the acceptors in the layer 2 decreases steeply, whereas the concentration ($N_D$) of the donors, on account of their higher diffusion coefficient, declines in a relatively shallow manner only. At the locality of the grown layer 2 most remote from the substratum, the concentration of the donors preferably amounts to about $10^{15}$ to $10^{17}$ deflection atoms per $cm.^3$ only.

Plotted in FIG. 2 over the width of substratum 1 and layer 2 is the difference ($N_D$ minus $N_A$) of the two types of lattice activators resulting from the activator distribution according to FIG. 1. As is apparent, the substratum 1 is $p^+$-conductive due to the large excess of the acceptors ($N_A$). The high p-type conductance rapidly decreases down to the intersection 2′ of the two $N_A$- and $N_D$-curves in the layer 2 (see FIG. 1). At this intersection point 2′, the p-conductance changes to n-type conductance (p-n junction). With further distance from the substratum, the n-type conductance increases rapidly up to a maximum at 2″ and thereafter decreases continuously and less steeply down to the desired low value at the side of the grown layer 2 remote from the substratum 1.

This method is well suitable for germanium because the donors more rapidly diffuse in germanium than the acceptors. The carrier or substratum 1 according to FIG. 1 thus preferably consists of germanium with a large excess of acceptors ($N_A$) so that the substratum has $p^+$-type conductance. During growth of the epitaxial layer 2, or during the tempering performed after termination of the growth, the layer 2, at the side facing away from the substratum 1, has n-type conductance in the order of magnitude of only 0.1 $ohm^{-1}$ $cm.^{-1}$, which increases in the direction toward the p-n junction 2′ first up to the maximum 2″ of about 1 $ohm^{-1}$ $cm.^{-1}$.

Consequently, by producing on the side of layer 2 remote from the substratum 1 a reversely doped region 3 in known manner, for example by diffusing or alloying p-conducting lattice activators into the n-type layer 2 (this being indicated by the more densely hatched region 3 in FIG. 1 and the broken-line portion of the difference curve $N_A - N_D$ in FIG. 2), then this region 3 forms the p-conducting emitter region E adjacent to a relatively high-ohmic region B that forms the p-n junction 2′ with the low-ohmic collector C (FIG. 2). The desired lattice activator profile in the base region B of the transistor is thus secured, namely a high-ohmic resistance in front of the emitter (low capacitance of the emitter barrier layer) and a low-ohmic doping maximum (low base resistance).

As mentioned, the diffusion of the donors and acceptors into the grown layer 2 does not absolutely require employing a subsequent tempering treatment, if according to the invention the lattice activators are caused to diffuse properly from the substratum into the growing layer during the epitaxial precipitation. This also affords giving the lattice-activator profile a shape departing from the normal course of diffusion distribution by varying, according to another feature of my invention, the rate of speed of crystalline growth during pyrolytic precipitation. For example, by varying the precipitation conditions (temperature of the substratum, composition of the gases flowing in contact with the substratum) the semi-conductor substance can be caused to precipitate first at a slow rate and thereafter at a faster rate so that the thickness of the growing layer 2 first increases slowly and thereafter more rapidly. In this manner, there is obtained an initially shallow course of doping (FIG. 3) in the layer 2 which then assumes a steeper course (at 2‴), this being shown in FIGS. 3 and 4.

Figure 3:
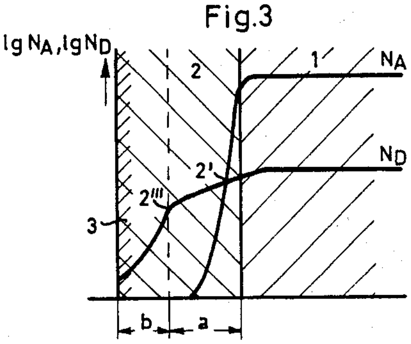
Figure 4:
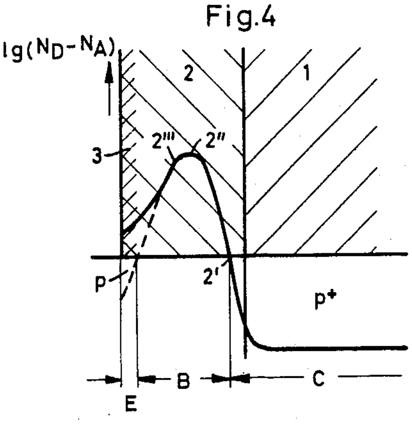
Figure 5:
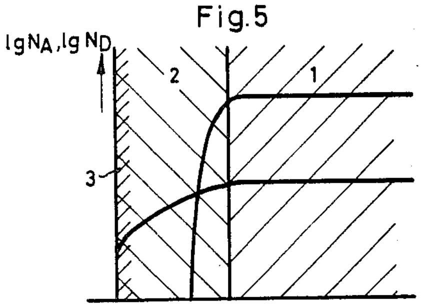

In FIGS. 3 and 4, presenting diagrams comparable to those of FIGS. 1 and 2, the same reference characters are applied as in FIGS. 1 and 2. Plotted on the vertical axis are the logarithmic values of the concentrations $N_A$ and $N_D$ (FIG. 3) or the logarithmic value of the difference between the two concentrations (FIG. 4). Particularly with a continuous acceleration of the precipitation, an upwardly convex distribution can be obtained in lieu of an upwardly concave (FIG. 1) distribution. Such an upwardly convex distribution is shown schematically in FIGS. 5 and 6. The knee point (2‴ in FIG. 3) of the donor concentration ($N_D$) in the grown layer 2, however, came about by abrupt change in the rate of growth. Until point 2‴ was reached the thickness of the layer 2 grew slowly and thereafter considerably faster.

Also shown in FIGS. 3 to 6 are the emitter region (3; E), base region (B) and collector region (C). A broken line shows the course of the lattice-defection excess ($N_D - N_A$) as it results in the semiconductor crystal upon its completion and after formation of the region (3). As will be recognized from the activator excess ($N_A - N_D$), the base (B) in all cases possesses a relatively slight conductance at the p-n junction with the emitter, so that the emitter-base capacitance is small, this being often desired for transistors.

It is often advisable to precipitate additionally foreign substances (activator or dope substances) during epitaxial growth of the semiconductor layer on the substratum 1, for giving the lattice-activator distribution in the finished semiconductor crystal a desired characteristic. For this purpose, it is preferable to select foreign substances that produce in the grown semiconductor layer 2 a conductance type opposed to that of the substratum 1. Furthermore, according to another feature of my invention, the concentration of the foreign substances precipitated during epitaxial deposition of the layer 2 can be varied, particularly in such a manner that after termination of the growth or after tempering, the layer 2 determines, virtually down to the substratum, the conductance type opposed to that of the substratum and having a steep decrease in magnitude of conductance in the direction away from the substratum.

For the purposes of the invention, the lattice activator (defection) atoms in the substratum 1 or in the grown layer 2 need not necessarily or exclusively have energy levels or terms close to the upper or lower edge of the forbidden band of the semiconductor substance so as to act essentially only as donors or acceptors. That is, other types of lattice activator (defection) atoms may also be present in the substratum, particularly those that act as recombination centers, for example nickel or gold. During growth of the epitaxial layer and/or due to the subsequent tempering treatment, these recombination centers diffuse into the epitaxial layer 2.

Suitable as recombination centers for germanium are gold, nickel and copper. Gold is preferably used for silicon; however, copper and nickel are also applicable. The concentration with which these substances are built into the grown layer is about $10^{16}$ per $cm.^3$.

FIG. 7 shows in section the semiconductor body of a p-n-p transistor produced by the method according to the invention. The reference characters applied in FIG. 7 correspond to those used in FIGS. 1 to 6. As indicated in FIG. 7, the substratum 1 is $p^+$-conducting due to a large excess of acceptors. Epitaxially grown onto the substratum 1 in the above-described manner is the layer 2 in which the p-n junction is located. The layer 2 has n-type conductance at the side romote from the substratum. A metal electrode 4 is alloyed into the layer 2 in known manner to form the emitter region 3. The alloyed emitter region 3 has p-type conductance. Attached to the epitaxially grown layer 2 is the base electrode 5 forming a barrier-free (ohmic) contact. For this purpose the layer 2 is greatly overdoped with n-type activator atoms beneath the base electrode 5 so that the layer 2 in this region has $n^+$-type conductance. The substratum 1 itself is provided with a barrier-free collector electrode 6. When attaching the electrode 6, for example by allowing, a $p^{++}$-type zone is produced in the substratum 1 immediately adjacent to the electrode 6.

To further describe the invention the following examples are given. It is to be understood that the invention is not to be limited by the examples.

*Example 1*

Figure 8:
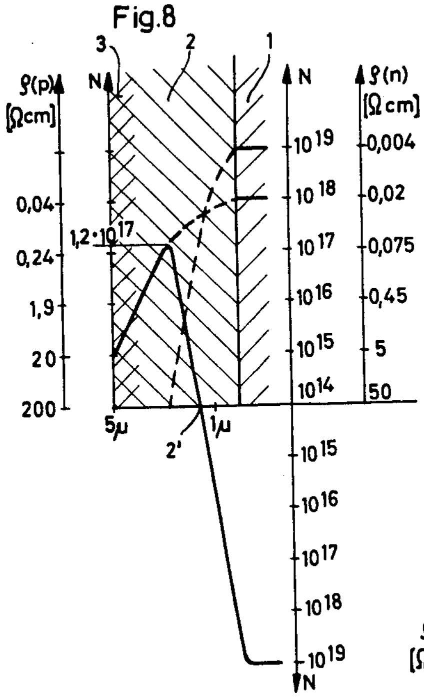

The substratum 1 consists of silicon doped with phosphorus and aluminum. The phosphorus concentration $N_P$ is about $10^{19}$. The aluminum concentration $N_{Al}$ is about $10^{18}$. Consequently, the substratum possesses strong n-type conductance ($n^+$ zone). The reaction gas contains $SiCl_4$ or $SiHCl_3$ and is diluted with $H_2$. The proportion of the silicon compound in the gas mixture amounts to 1%, for example, but may also be several percent. The rate of precipitation is dependent upon the flow rate of the reaction gas and is maximum 0.5–1$\mu$ per minute. The precipitation temperature is in the range of 1050 to 1150° C. At 1150° C. the diffusion constant (coefficient) of phosphorus and silicon is $10^{-12}$ cm.$^2$/sec. and the diffusion constant of aluminum and silicon is $5 \cdot 10^{-12}$ cm.$^2$/sec. At lower precipitation temperatures the precipitation constant is correspondingly lower. A silicon layer of 5$\mu$ thickness is epitaxially grown. The necessary time is five minutes at a precipitation rate of 1$\mu$/min. Thereafter tempering is performed at 1100° C. for 75 minutes. Shown in FIG. 8 are the diffusion curves of phosphorus and aluminum by broken lines. The impurity-atom (activator) distribution in the grown layer, resulting from the difference $N_P - N_{Al}$ is indicated by the full-line curve. The p-n junction formed by diffusion is spaced 1.5$\mu$ from the substratum. The region at the left of the p-n junction 2' has p-type conductance and possesses maximum p-doping at a distance of 2.8$\mu$ from the substratum. This maximum p-doping corresponds to an aluminum concentration of $1.2 \cdot 10^{17}$. At the right of the p-n junction 2' the grown layer has n-type conductance. The specific resistance of this zone decreases toward the substratum 1. The values of the specific resistance, which correspond to the different impurity-atom concentrations in the p-conducting and n-conducting zones, are additionally entered on the vertical. The hatched area is reversely doped, for example, by alloying a gold-antimony foil into the semiconductor, or by diffusing a corresponding impurity substance into the body, if desired, while employing known masking techniques. The reversely doped region then forms the emitter zone of an n-p-n transistor.

*Example 2*

Figures 9, 12:
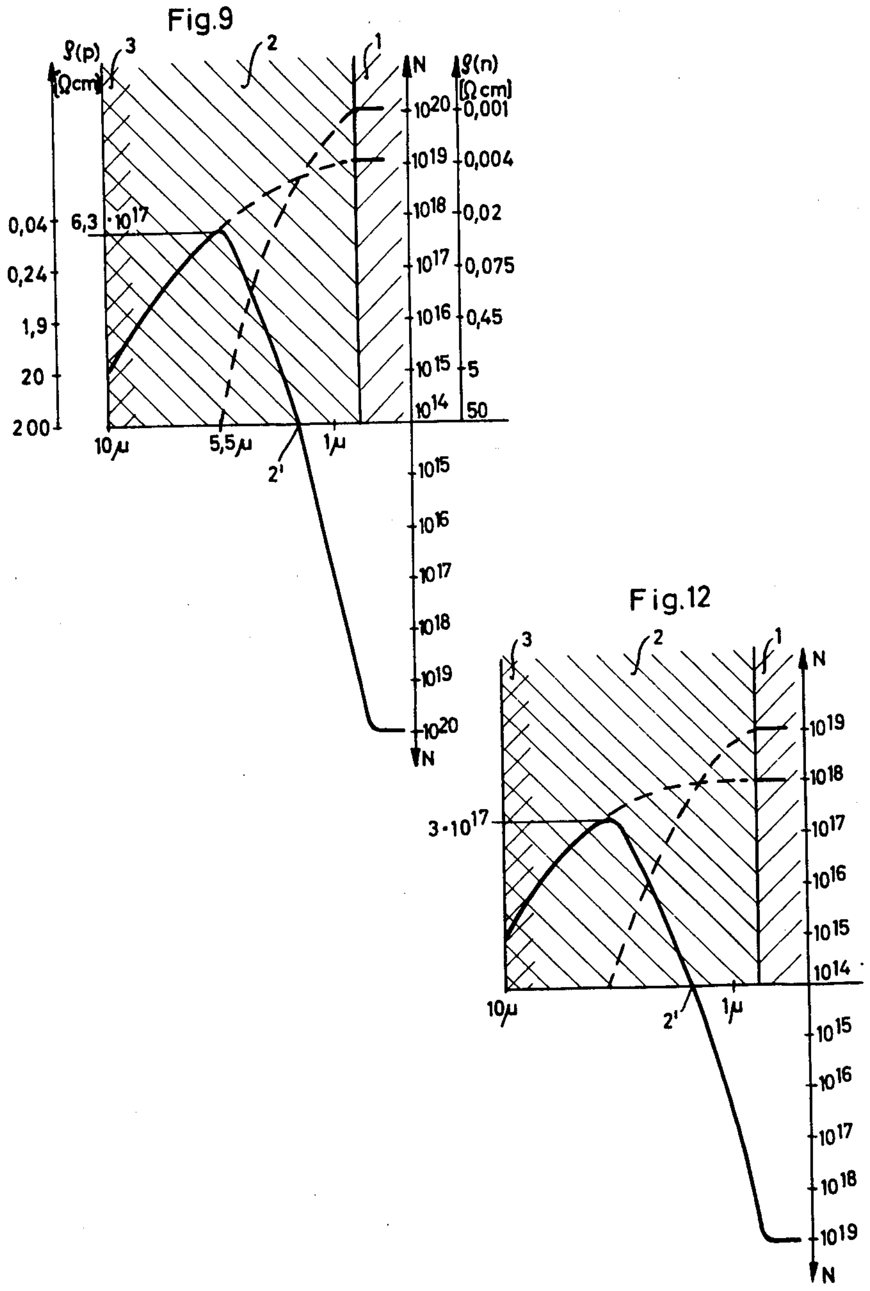

The substratum 1 consists of silicon doped with phosphorus and aluminum, with an impurity-atom (activator atom) concentration of the phosphorus $10^{20}$; the corresponding concentration of aluminum is $10^{19}$. The requirements described in the preceding example also apply for the growing process in the present case. A layer of 10$\mu$ thickness is grown. Thereafter the product is tempered at 1150° C. for 90 minutes. The resulting concentration distribution is represented in FIG. 9. At a distance of 5.5$\mu$ from the substratum, the p-doping has its maximum and corresponds to an aluminum concentration of $6.3 \cdot 10^{17}$. The p-n junction 2' is spaced 2.5$\mu$ from the substratum. The portion of the grown layer denoted by 3 is then reversely doped in known manner, for example by alloying, and then constitutes the emitter of an n-p-n transistor. In general, the tempering time with this method can be varied betwen 10 minutes and 2 hours.

*Example 3*

Figure 10:
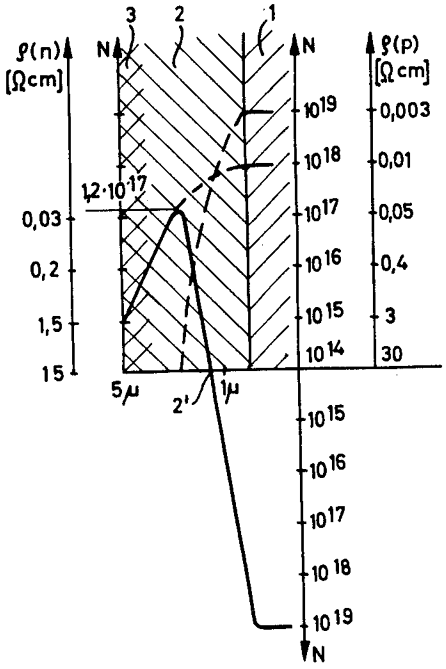

The substratum 1 consists of germanium doped with phosphorus and boron. The boron concentration is $10^{19}$. The phosphorus concentration is $10^{18}$. Consequently, the substratum is strongly p-doped ($p^+$ zone). The reaction gas contains germanium tetrachloride and is diluted with hydrogen. The proportion of $GeCl_4$, for example, is 1%, but may also amount to several percent. The precipitation rate can be varied by the flow rate of the gas and amounts, for example to 1$\mu$ per minute. The precipitation temperatures are between 800 and 900° C. In this example, a layer of 5$\mu$ thickness is precipitated at 850° C. Subsequently, the product is tempered at 850° C. for 5 minutes. The diffusion rates at 850° for boron is $6 \cdot 10^{-12}$ cm.$^2$/sec. and for phosphorus $3 \cdot 10^{-11}$ cm.$^2$/sec. The resulting concentration distribution in the grown layer is represented in FIG. 10. At the left of the p-n junction 2', which is spaced 2.5$\mu$ from the substratum, the grown layer is n-conducting and possesses maximum n-doping at a distance of 2.8$\mu$ from the substratum. The maximum n-doping correspondings to a phorous concentration of $1.2 \cdot 10^{17}$. By reversely doping the zone 3, for example, in accordance with the germanium-mesa technique by vapor-depositing and alloying, or by diffusing impurity into the semiconductor body, the emitter zone and thus a p-n-p transistor are produced.

*Example 4*

Figure 11:
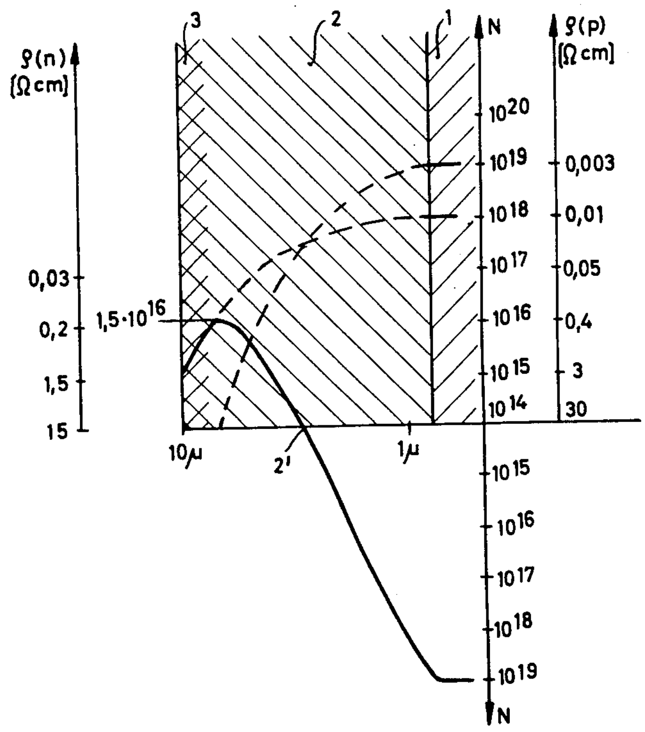

In distinction from Example 3, a layer of 10$\mu$ thickness is precipitated and thereafter tempered at 900° C. for 9 minutes. The resulting concentration distribution is represented in FIG. 11. The p-n junction is spaced 5.1$\mu$ from the substratum 1. The maximal doping in the p-conducting portion of the grown layer at the left of the p-n junction is spaced 8.5$\mu$ from the substratum and corresponds to a phosphorus concentration of $10^{16}$. The emitter is again produced by one of the above-described methods by reversely doping the zone 3. The maximum precipitation rate is between 0.5 and 1$\mu$ per minute also for germanium. The tempering time can be varied between 5 and 10 minutes. The tempering is effected in the described embodiments in a normal tubular furnace in inert or lightly oxidizing atmosphere or in vacuum.

*Example 5*

By reaction of the flow velocity in the reaction space, the precipitation rate can be reduced, for example from 1$\mu$ per minute to 0.1$\mu$ per minute at the same temperature as stated in Examples 1 to 4. Thus, by varying the flow velocity, it is possible to obtain growing rates that are comparable with the diffusion rates of the more rapidly diffusing substances. This applies to germanium as well as to silicon and makes possible the performance of the diffusion simultaneously with the growing process.

*Example 6*

The Example 4 described above can be modified as follows. The substratum of germanium contains phosphorus and gallium as doping substances. The gallium concentration is $10^{19}$, the phosphorus concentration $10^{18}$. The diffusion constant of gallium for 1150° C. is at $10^{-12}$ cm.$^2$/sec. While growing the germanium layer, a layer of 5$\mu$ thickness is first grown at a rate of 0.1$\mu$ per minute at a precipitation temperature of 1150° C. Consequently, a time of 50 minutes is required to thus precipitate a layer of this thickness. During this time, as represented in FIG. 12, the phosphorus is virtually constant with respect to its diffusion into the grown layer, whereas the gallium concentration has declined to $10^{14}$. Thereafter, rapid precipitation is effected, for example at 820° C. at a precipitation rate of 0.5–1$\mu$ per minute. The product is then tempered at 850° C. for 5 minutes. The p-n junction 2' is then spaced 2.5$\mu$ from the substratum. The maximum doping, corresponding to a phosphorus concentration of $3 \cdot 10^{17}$ is spaced 6.5$\mu$ from the substratum. The emitter is produced as described in the preceding example. With this method a higher doping of the base region is obtained in comparison with the embodiment of FIG. 11. Furthermore, a shallower course of the collector gradient can be attained, especially if the range of slow growth is chosen rather large. In contrast to the example described under 1 to 4, it is preferable with this latter method to select doping substances that exhibit a particularly great difference of their respective diffusion constants.

In the method last described, a greater possibility of variation is available than with the preceding examples described. The transistors produced according to this method exhibit a particularly small emitter capacitance, a small collector capacitance, and a high locking voltage due to the shallow collector gradient, and a small base resistance due to the high maximal doping in the base zone. The method can also be carried out with silicon, for example while employing aluminum and antimony as doping substances.

Obviously, many modifications and variations of the present invention are possible in the light of the above teachings. It is therefore to be understood that within the scope of the appended claims, the invention may be practiced otherwise than as specifically described.

I claim:

1. The method of producing a p-n junction in a monocrystalline semiconductor device, which comprises the steps of pyrolytically precipitating from a gaseous compound a pure monocrystalline semiconductor layer upon a monocrystalline substratum of the same semiconductor substance highly doped with donor-type and acceptor-type activator atoms of respectively different diffusion coefficients, the activator atoms having the lower diffusion coefficient are present in the substratum in a quantity preponderant over that of the activator atoms having the higher diffusion coefficient, and heated to pyrolytic reaction temperature, and subjecting the substratum and layer to diffusion temperature for a period of time sufficient for only one of said two types of activator atoms to diffuse from the substratum into and through said grown layer and to essentially cause the desired conductance type at the layer side remote from said substratum, said period being too short for the activator atoms of the other type to reach an appreciable portion of said layer.

2. The method of producing a p-n junction in a monocrystalline semiconductor device, which comprises preparing a semiconductor substratum doped with donor type and acceptor type activator atoms of respectively different diffusion coefficients, the activator atoms having the lower diffusion coefficient are present in the substratum in a quantity preponderant over that of the activator atoms having the higher diffusion coefficient, epitaxially growing upon said substratum a pure monocrystalline layer of the same semiconductor substance by heating said substratum to pyrolytic precipitation temperature in contact with a pyrolytically dissociable gaseous compound of said semiconductor substance, and subjecting said body together with said grown layer to diffusion temperature for a period of time sufficient for only one of said two types of activator atoms to diffuse from the substratum into and through said grown layer and to essentially cause the desired conductance type at the layer side remote from said substratum, said period being too short for the activator atoms of the other type to reach an appreciable portion of said layer.

3. The method of producing a p-n junction in a monocrystalline semiconductor device, which comprises preparing a semiconductor substratum doped with donor-type and acceptor-type activator atoms of respectively different diffusion coefficients, the activator atoms having the lower diffusion coefficient are present in the substratum in a quantity preponderant over that of the activator atoms having the higher diffusion coefficient, epitaxially growing upon said substratum a pure monocrystalline layer of the same semiconductor substance by heating said substratum to pyrolytic precipitation temperature in contact with a pyrolytically dissociable gaseous compound of said semiconductor substance, and thereafter tempering the resulting semiconductor body at a diffusion temperature for a period of time sufficient for only one of said two types of activator atoms to diffuse from the substratum into and through said grown layer and to essentially cause the desired conductance type at the layer side remote from said substratum, said period being too short for the activator atoms of the other type to reach an appreciable portion of said layer.

4. The method of producing a p-n junction in a monocrystalline semiconductor device, which comprises preparing a semiconductor substratum doped with donor-type and acceptor-type activator atoms of respectively different diffusion coefficients, the activator atoms having the lower diffusion coefficient are present in the substratum in a quantity preponderant over that of the activator atoms having the higher diffusion coefficient, epitaxially growing upon said substratum a pure monocrystalline layer of the same semiconductor substance by heating said substratum to pyrolytic precipitation temperature in contact with a pyrolytically dissociable gaseous compound of said semiconductor substance, and selecting the rate of growth of the precipitating substance and the temperature and growing period for diffusion of only one of said types of activator atoms from the substratum into and through said layer while thereby preventing the other type of activator atoms from reaching an appreciable portion of said layer.

5. The method of producing a p-n junction in a monocrystalline semiconductor device, which comprises the steps of pyrolytically precipitating from a gaseous compound a pure monocrystalline germanium layer upon a monocrystalline germanium substratum having a preponderant amount of acceptor atoms and a lesser amount of donor atoms thereby having high p-type conductance, and heated to pyrolytic reaction temperature, and subjecting the substratum and layer to diffusion temperature for a period of time sufficient for the acceptor atoms to diffuse from the substratum into and through said grown layer, said period of time being too short for the donor atoms to reach an appreciable portion of said layer.

6. The method of producing a p-n junction in a monocrystalline semiconductor device, which comprises the steps of pyrolytically precipitating from a gaseous compound a pure monocrystalline silicon layer upon a monocrystalline silicon substratum having a preponderant amount of donor atoms and a lesser amount of acceptor atoms thereby having high n-type conductance, and heated to pyrolytic reaction temperature, and subjecting the substratum and layer to diffusion temperature for a period of time sufficient for the donor atoms to diffuse from the substratum into and through said grown layer, said period of time being too short for the acceptor atoms to reach an appreciable portion of said layer.

7. The method of producing a p-n junction in a monocrystalline semiconductor device, which comprises the steps of pyrolytically precipitating from a gaseous compound a pure monocrystalline semiconductor layer upon a monocrystalline substratum of the same semiconductor substance highly doped with donor-type and acceptor-type activator atoms of respectively different diffusion coefficients, the activator atoms having the lower diffusion coefficient are present in the substratum in a quantity preponderant over that of the activator atoms having the higher diffusion coefficient, said substratum containing lattice impurity atoms active as recombination centers, and heated to pyrolytic reaction temperature, and subjecting the substratum and layer to diffusion temperature for a period of time sufficient for only one of said two types of activator atoms to diffuse from the substratum into and through said grown layer and to essentially cause the desired conductance type at the layer side remote from said substratum, said period being too short for the activator atoms of the other type to reach an appreciable portion of said layer.

8. The method of producing a p-n junction in a monocrystalline semiconductor device, which comprises the steps of pyrolytically preciptating from a gaseous compound a pure monocrystalline semiconductor layer together with lattice impurity atoms active as recombination centers upon a monocrystalline substratum of the same semiconductor substance highly doped with donor-type and acceptor-type activator atoms of respectively different diffusion coefficients, the activator atoms having the lower diffusion coefficient are present in the substratum in a quantity preponderant over that of the activator atoms having the higher diffusion coefficient, and heated to pyrolytic reaction temperature, and subjecting the substratum and layer to diffusion temperature for a period of time sufficient for only one of said two types of activator atoms to diffuse from the substratum into and through said grown layer and to essentially cause the desired conductance type at the layer side remote from said substratum, said period being too short for the activator atoms of the other type to reach an appreciable portion of said layer.

9. The method of producing a p-n junction in a monocrystalline semiconductor device, which comprises the steps of pyrolytically preciptating from a gaseous compound a pure monocrystalline semiconductor layer at varying rates upon a monocrystalline substratum of the same semiconductor substance highly doped with donor-type and acceptor-type activator atoms of respectively different diffusion coefficients, the activator atoms having the lower diffusion coefficient are present in the substratum in a quantity preponderant over that of the activator atoms having the higher diffusion coefficient, and heated to pyrolytic reaction temperature, and subjecting the substratum and layer to diffusion temperature for a period of time sufficient for only one of said two types of activator atoms to diffuse from the substratum into and through said grown layer and to essentially cause the desired conductance type at the layer side remote from said substratum, said period being too short for the activator atoms of the other type to reach an appreciable portion of said layer.

10. The method of producing a p-n junction in a monocrystalline semiconductor device, which comprises the steps of pyrolytically preciptating from a gaseous compound a pure monocrystalline semiconductor layer, first at a slow precipitation rate followed by a faster preciptation rate, upon a monocrystalline substratum of the same semiconductor substance highly doped with donor-type and acceptor-type activator atoms of respectively different diffusion coefficients, the activator atoms having the lower diffusion coefficient are present in the substratum in a quantity preponderant over that of the activator atoms having the higher diffusion coefficient, and heated to pyrolytic reaction temperature, and subjecting the substratum and layer to diffusion temperature for a period of time sufficient for only one of said two types of activator atoms to diffuse from the substratum into and through said grown layer and to essentially cause the desired conductance type at the layer side remote from said substratum, said period being too short for the activator atoms of the other type to reach an appreciable portion of said layer.

11. The method of producing a p-n junction in a monocrystalline semiconductor device, which comprises the steps of pyrolytically precipitating from a gaseous compound a pure monocrystalline semiconductor layer upon a monocrystalline substratum of the same semiconductor substance highly doped with donor-type and acceptor-type activator atoms of respectively different diffusion coefficients in a concentration of $10^{18}$ to $10^{19}$ atoms per $cm.^3$, the activator atoms having the lower diffusion coefficient are present in the substratum in a quantity preponderant over that of the activator atoms having the higher diffusion coefficient, and heated to pyrolytic reaction temperature, and subjecting the substratum and layer to diffusion temperature for a period of time sufficient for only one of said two types of activator atoms to diffuse from the substratum into and through said grown layer and to essentially cause the desired conductance type at the layer side remote from said substratum, said period being too short for the activator atoms of the other type to reach an appreciable portion of said layer.

References Cited by the Examiner

UNITED STATES PATENTS

| | | | |
|---|---|---|---|
| 2,899,344 | 8/1959 | Atalla et al. | 148—191 |
| 2,964,689 | 12/1960 | Buschert et al. | 148—1.5 X |
| 3,006,789 | 10/1961 | Nijland | 148—1.5 |
| 3,085,033 | 4/1963 | Handelman | 148—191 |

FOREIGN PATENTS

| | | |
|---|---|---|
| 557,168 | 11/1957 | Belgium. |
| 629,213 | 10/1961 | Canada. |

OTHER REFERENCES

Marinace: "P-N Junction Fabrication," I.B.M. Technical Disclosure Bulletin, vol. 3, No. 2, July 1960, p. 45.

HYLAND BIZOT, *Primary Examiner.*

RAY K. WINDHAM, DAVID L. RECK, *Examiners.*

M. A. CIOMEK, N. F. MARKVA, *Assistant Examiners.*